United States Patent
Hamaguchi et al.

(10) Patent No.: US 7,198,848 B2
(45) Date of Patent: Apr. 3, 2007

(54) TWO-PHASE GLASS-LIKE CARBON MEMBER AND METHOD OF MANUFACTURING THE SAME

(75) Inventors: Maki Hamaguchi, Kobe (JP); Takayasu Fujiura, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 11/055,978

(22) Filed: Feb. 14, 2005

(65) Prior Publication Data
US 2005/0186426 A1   Aug. 25, 2005

(30) Foreign Application Priority Data
Feb. 23, 2004   (JP)   ............... 2004-046671

(51) Int. Cl.
*B32B 9/00* (2006.01)
(52) U.S. Cl. .................................... 428/408
(58) Field of Classification Search ............... 428/408; 427/448, 249.1; 423/445; 445/49
See application file for complete search history.

(56) References Cited

U.S. PATENT DOCUMENTS 4,204,769 A * 5/1980 Lersmacher et al. ........ 356/244
4,816,338 A * 3/1989 Terasaki et al. ............. 428/408
4,894,215 A * 1/1990 Kawakubo et al. ........ 423/449.6
5,961,361 A * 10/1999 Endoh et al. .................. 445/49
6,245,313 B1 * 6/2001 Suzuki et al. ............ 423/445 R

FOREIGN PATENT DOCUMENTS

| JP | 64-47019 | 2/1989 |
| JP | 10-95668 | 4/1998 |
| KR | 2002-0025875 | 4/2002 |
| WO | WO 00/73243 A1 | 12/2000 |

* cited by examiner

*Primary Examiner*—Jennifer McNeil
*Assistant Examiner*—Daniel Miller
(74) *Attorney, Agent, or Firm*—Oblon, Spivak, McClelland, Maier & Neustadt, P.C.

(57) ABSTRACT

A two-phase glass-like carbon member has, in combination, a porous glass-like carbon base, and a dense glass-like carbon surface layer formed on the porous glass-like carbon base. The porous glass-like carbon base can be formed in a large thickness. The dense glass-like carbon surface layer is superior to the porous glass-like carbon base in gas impermeability, surface hardness and resistance to dusting. The dense glass-like carbon surface layer supplements disadvantages of the porous glass-like carbon base. The two-phase glass-like carbon member can be in a large thickness exceeding 5 mm and in a complicated shape.

8 Claims, 1 Drawing Sheet

TWO-PHASE GLASS-LIKE CARBON MEMBER AND METHOD OF MANUFACTURING THE SAME

BACKGROUND OF THE INVENTION

1. Field of the Invention

The present invention relates to a two-phase glass-like carbon member suitable for forming glass-like carbon members having a thickness exceeding 5 mm. These carbon members can be used as susceptors for supporting a silicon wafer when the silicon wafer is subjected to a thermal process. This invention also relates to a method of manufacturing such a two-phase glass-like carbon member.

2. Description of the Related Art

Glass-like carbon a carbon material has highly isotropic physical properties owing to its chemical structure.

Glass-like carbon, as compared with graphite, is very hard and has a conchoidal fracture resembling that of glass. Glass-like carbon is characterized by its very low gas permeability and small carbon particle dissipation. Glass-like carbon is classified into non-graphitizing carbon, and is obtained by carbonizing a thermosetting resin, such as a furan resin, or a phenolic resin.

Glass-like carbon is resistant to heat of 2000° C. or above in an inert atmosphere, exhibits excellent corrosion resistance to hydrogen fluoride and fluorine. Therefore, glass-like carbon members have been progressively prevalently used in semiconductor device fabricating systems, particularly, in CVD systems for carrying out CVD methods (chemical vapor deposition methods) to form films, using corrosive gases and required to generate impurities scarcely.

There are two general restrictions on the manufacture of a glass-like carbon member. A first restriction requires that the thickness of the glass-like carbon member must be less than about 3 or 5 mm. The first restriction is placed because the a thermosetting resin molding breaks due to gas generation in a carbonizing process that converts the thermosetting resin molding for carbonization. Water, carbon monooxide and carbon dioxide gas are produced by the thermal decomposition of the resin in the carbonizing process. Since the gas permeability of the resin or a transient substance produced during the carbonization of the resin is not necessarily high, the thermosetting resin molding breaks due to stress induced therein by the generated gas if the thermosetting resin molding has an excessively large thickness. Therefore, the general glass-like carbon member is required to have a small thickness of less than about 3 or 5 mm and possible glass-like carbon members have been limited to disks and pipes.

A second restriction is that glass-like carbon is hard to work by grinding due to the high surface hardness and low toughness of glass-like carbon and that thermosetting resin which is a preform of glass-like carbon is poor in moldability and workability. Thus, it has been difficult to manufacture glass-like carbon members having a complicated shape at low manufacturing costs.

A first conventional technique to eliminate the first restriction is to heat and compresse a solid thermosetting resin to form a porous thermosetting resin molding, and carbonize the porous thermosetting resin molding to obtain a porous glass-like carbon member. Since this porous glass-like carbon member is obtained by carbonizing the porous thermosetting resin molding, the porous thermosetting resin molding can be carbonized without being broken by gas generation even if the thickness of the porous thermosetting resin molding is greater than about 5 mm. Since the porous thermosetting resin molding is excellent in grindability, the minute adjustment of the shape of the porous thermosetting resin molding can be easily achieved and hence a porous glass-like carbon member having a complicated shape can be obtained.

However, the porous glass-like carbon member is inferior to the dense glass-like carbon member in resistance to gas adsorption and gas permeation. The porous glass-like carbon member having a low surface hardness is liable to produce particles. Thus the porous glass-like carbon member does not satisfactorily satisfy characteristics required of the glass-like carbon member including resistance to gas adsorption, resistance to gas permeation, high surface hardness and corrosion resistance.

A second conventional technique provides a glass-like carbon-coated carbon member having a carbon base formed of, for example, graphite and a glass-like coating the carbon base (refer to JP-A 64-47019 and JP-A 10-95668 for more information). This glass-like carbon-coated carbon member is manufactured by coating a graphite base with a thermosetting resin, and carbonizing the thermosetting resin coating the graphite base to coat the graphite base with a glass-like carbon coating. Since the carbon base of this glass carbon-coated carbon member is formed of graphite, the glass-like carbon-coated carbon member can be formed in a thickness exceeding about 5 mm. Since graphite is highly workable, the glass-like carbon-coated carbon member can be formed in a complicated shape.

However, only the thermosetting resin coating the graphite base of the glass-like carbon-coated carbon member shrinks and the graphite base does not shrink during carbonization. Consequently, stress is induced in the glass-like carbon-coated carbon member due to difference in dimensional change between the graphite base and the glass-like carbon coating and, in some cases, the glass-like carbon coating falls off the graphite base. The adhesion of the glass-like carbon coating to the graphite base is insufficient due to the shrinkage of the thermosetting resin surface layer during carbonization and hence it often occurred that the glass-like carbon coating comes off the graphite base while the glass-like carbon-coated carbon member is in use. If the graphite base is not perfectly coated with the glass-like carbon coating, graphite particles and impurities are produced.

SUMMARY OF THE INVENTION

Accordingly, it is an object of the present invention to provide a two-phase glass-like carbon member capable of being formed in a thickness exceeding 5 mm and of being formed in a complicated shape by using a porous glass-like carbon capable of forming a thick member and a dense glass-like carbon superior to the porous glass-like carbon in resistance to gas permeation, hardness and resistance to dusting. Another object of the present invention is to provide a two-phase glass-like carbon member manufacturing method capable of manufacturing a two-phase glass-like carbon member having a base and a dense glass-like carbon surface layer coating the base and resistant to breakage and separation from the base.

A two-phase glass-like carbon member in a first aspect of the present invention includes: a porous glass-like carbon base, and a dense glass-like carbon surface layer coating a surface of the porous glass-like carbon base.

Desirably, the dense glass-like carbon surface layer of the two-phase glass-like carbon member has a thickness in the range of 0.2 to 5 mm.

The two-phase glass-like carbon member of the present invention is suitable for use as a susceptor for supporting a silicon wafer thereon to process the silicon wafer by a thermal process.

A two-phase glass-like carbon member manufacturing method of manufacturing a two-phase glass-like carbon member in a second aspect of the present invention includes the steps of: forming a porous thermosetting resin base by heating and compressing a workpiece of a solid thermosetting resin for curing and molding; forming a two-layer structure by coating a surface of the porous thermosetting resin base with a dense thermosetting resin surface layer; and completing a two-phase glass-like carbon member including a porous glass-like carbon base and a dense glass-like carbon surface layer formed on the porous glass-like carbon base by heating the two-layer structure for carbonization.

Desirably, the two-phase glass-like carbon member manufacturing method includes the step of curing the porous thermosetting resin base at a temperature between 200 and 300° C. for a time between 10 and 100 hr for a post curing process before the step of forming the two-layer structure by coating the surface of the porous thermosetting resin base with the dense thermosetting resin surface layer.

The two-layer structure can be carbonized to complete the two-phase glass-like carbon member without being broken due to gas generation even if the porous glass-like carbon base is thick because the porous glass-like carbon base of the two-layer structure is formed of porous glass-like carbon. Since the porous thermosetting resin base as a preform for a porous glass-like carbon base is excellent in grindability, the porous thermosetting resin base can be formed in a thickness above 5 mm and can be formed in a complicated shape like that of a wafer boat. Since the support surface, on which a workpiece, such as a silicon wafer, is supported, of the two-phase glass-like carbon member is formed of the dense glass-like carbon, the two-phase glass-like carbon member is capable of exercising characteristics required of glass-like carbon including heat resistance, corrosion resistance, gas impermeability, abrasion resistance, chemical stability, high surface hardness and resistance to dusting.

Thus the present invention provides a two-phase glass-like carbon member consisting of the porous glass-like carbon base and a dense glass-like carbon surface layer formed on the porous glass-like carbon base, capable of being formed in a large thickness suitable for forming a susceptor for a thermal process, such as a CVD process for processing a silicon wafer and in a complicated shape like that of a wafer boat to be used in a thermal process for processing a silicon wafer.

The two-phase glass-like carbon member manufacturing method of the present invention carbonizes the two-layer structure having the porous thermosetting resin base and the dense thermosetting resin surface layer formed on the porous thermosetting resin base. Since the porous thermosetting resin base and the dense thermosetting resin surface layer are formed of the thermosetting resin, the respective dimensions of the porous thermosetting resin base and the dense thermosetting resin surface layer change at substantially the same ratio due to thermal shrinkage during carbonization. Consequently, stresses induced in the porous glass-like carbon base and the dense glass-like carbon surface layer are low and hence the dense glass-like carbon surface layer will not crack or come off the porous glass-like carbon base. Since the two-phase glass-like carbon member is completed by carbonizing the two-layer structure of the porous thermosetting resin base and the dense thermosetting resin surface layer formed of the thermosetting resin, the dense glass-like carbon surface layer is bonded firmly to the porous glass-like carbon base, the dense glass-like carbon surface layer will not come off the porous glass-like carbon base while the two-phase glass-like carbon member is in use. Even if the dense glass-like carbon surface layer cracks by some rare accident, carbon particles and particles are not produced.

BRIEF DESCRIPTION OF THE DRAWINGS

The above and other objects, features and advantages will become more apparent from the following description taken in connection with the accompanying drawing.

DESCRIPTION OF THE PREFERRED EMBODIMENTS

Figure 1:
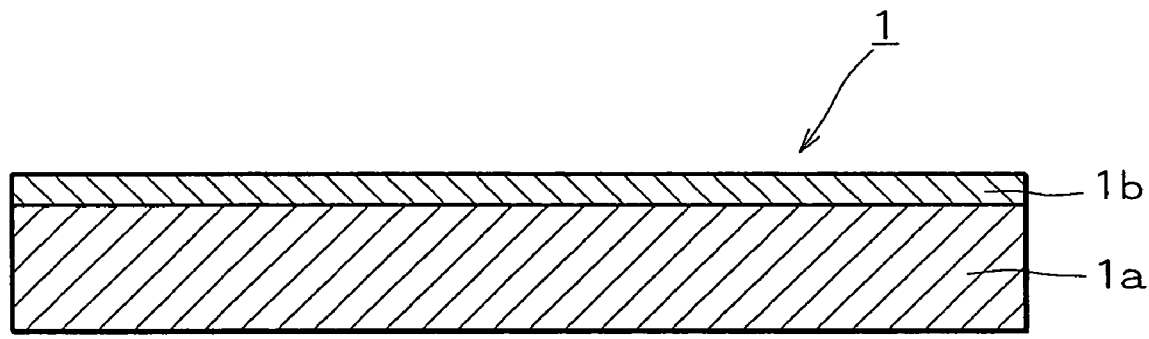
FIG. 1 is a typical sectional view of a two-phase glass-like carbon member in a third embodiment according to the present invention.

The two-phase glass-like carbon member of the present invention is characterized by the surface layer of dense glass-like carbon formed on the base of porous glass-like carbon. The dense glass-like carbon is the conventional impermeable glass-like carbon practically impermeable to gas. The impermeable glass-like carbon is called dense glass-like carbon to discriminate the same from the porous glass-like carbon. More concretely, the present invention decides whether or not a carbon specimen is a dense glass-like carbon specimen through the observation of a polished section of the carbon specimen by optical microscope of 100×magnification. The present invention defines a carbon-specimen having ten or less pores of diameters not smaller than 10 μm in a region of 100 μm sq. in a polished section as dense glass-like carbon specimen. The mean of three pieces of data obtained through the microscopic observation of three randomly selected regions in a section is used to determine the category of the carbon specimen.

The present invention decides whether or not a carbon specimen is a porous glass-like carbon specimen through the observation of a polished section of a carbon specimen by the foregoing method. The present invention defines a carbon specimen having pores of diameters exceeding 10 μm occupying 1% or above of the area of a region of 100 μm sq. in a polished section as porous glass-like carbon specimen. The thickness of the porous glass-like carbon specimen is determined through the microscopic observation of the section of the porous glass-like carbon specimen. It is desirable that the pores have the smallest possible sizes and the smallest possible volume, provided that the pores are through pores. The porous glass-like carbon needs pores occupying at least 1% of the area of the section. In view of strength, the ratio of the area of pores in a section to the area of the section is about 25% at the highest.

According to the present invention, the definition of a dense thermosetting resin surface layer is the same as that of a dense glass-like carbon specimen. According to the present invention, a porous thermosetting resin base (molding) is a structure having through pores. Through pores include substantially through pores. The porosity of the porous thermosetting resin base is determined through the measurement of the permeability of a specimen to a gas or a liquid. More concretely, it is decided that a specimen has through pores when substantially all of 1 $cm^3$ of ethyl alcohol dropped in an area of a diameter between 50 and 100 mm passes through the specimen within 10 s.

A two-phase glass-like carbon member manufacturing method includes the following steps.

Step of Forming Porous Thermosetting Resin Base

A porous thermosetting resin base is formed by heating and compressing a workpiece of a solid thermosetting resin for curing and molding. The porous thermosetting resin base, namely, a thermosetting resin molding, can be easily manufactured by subjecting a workpiece of a granular or particulate thermosetting resin to a compression molding process under process conditions that do not completely melt the thermosetting resin. The process conditions are properly determined taking into consideration the properties of the thermosetting resin and the size and/or shape of the porous thermosetting resin base. The process conditions includes heating a mold at a temperature about 10° C. lower than that at which a mold for forming a dense thermosetting resin molding and/or using a pressure equal to ⅓ to ⅕ of a pressure for forming a dense thermosetting resin molding.

Generally, the porous thermosetting resin base (thermosetting resin molding) is easily grindable. Therefore, the porous thermosetting resin base can be finished by grinding a workpiece after forming holes and grooves in the workpiece and forming the workpiece in dimensions and a shape nearly the same as the finishing dimensions and shape of the porous thermosetting resin base.

Thermosetting resins suitable for forming the porous thermosetting resin base are, for example, phenolic resins, furan resins and imide resins.

Step of Post Curing

The porous thermosetting resin base is subjected to a post curing process at a temperature between 200 and 300° C. for a time between 10 and 100 hr in air or in an inert gas, such as nitrogen gas for the following purpose. The porous thermosetting resin base is melted slightly when a thermosetting resin liquid is applied to the surface of the porous thermosetting resin base or the porous thermosetting resin base is impregnated with a thermosetting resin liquid to form a dense thermosetting resin surface layer on the porous thermosetting resin base by the next process. The porous thermosetting resin base is processed by the post curing process to prevent the porous thermosetting resin base from being melted by the thermosetting resin liquid. The porous thermosetting resin base is cured completely by the post curing process.

Step of Forming Dense Thermosetting Resin Surface Layer thermosetting resin base is impregnated with the thermosetting resin liquid after machining the porous thermosetting resin base by grinding or the like and processing the porous thermosetting resin base by the post curing process. The thermosetting resin liquid may be spread over a desired surface of the porous thermosetting resin base with a brush or a sprayer. A desired surface part of the porous thermosetting resin base can be impregnated with the thermosetting resin liquid by immersing the surface part of the porous thermosetting resin base in the thermosetting resin liquid. Thus the thermosetting resin liquid can be applied to the surface of the porous thermosetting resin base and/or the porous thermosetting resin base can be impregnated with the thermosetting resin liquid.

It is desirable to use the same thermosetting resin for forming porous thermosetting resin base and the dense thermosetting resin surface layer in order that the dimensional change due to thermal shrinkage of the porous thermosetting resin base corresponds to that of the dense thermosetting resin surface layer when a two-layer structure consisting of the porous thermosetting resin base and the dense thermosetting resin surface layer is heated for carbonization. Since the smaller the difference in dimensional change between the porous thermosetting resin base and the dense thermosetting resin surface layer, the less is the possibility of separation of the dense thermosetting resin surface layer from the porous thermosetting resin base, it is desirable to form the porous thermosetting resin base and the dense thermosetting resin surface layer, the less is the possibility of separation of the dense thermosetting resin surface layer from the porous thermosetting resin base, it is desirable to form the porous thermosetting resin base and the dense thermosetting resin surface layer of the same thermosetting resin under different compression molding conditions.

The dense thermosetting resin surface layer is not necessarily a liquid resin surface layer and hence a drying process is not essential. The dense thermosetting resin surface layer is formed on the porous thermosetting resin base by a known method as mentioned above by way of example. The dense thermosetting resin surface layer is a preform for a dense glass-like carbon surface layer. Preferably, the thickness of the dense thermosetting resin surface layer is 0.2 mm or above to form a dense glass-like carbon surface layer in a thickness not smaller than 0.2 mm by subjecting the dense thermosetting resin surface layer to a carbonizing process. When necessary, the surface of the dense thermosetting resin surface layer may be finished by machining, such as grinding.

Step of Carbonization

The two-layer structure consisting of the porous thermosetting resin base and the dense thermosetting resin surface layer is carbonized by heating the two-layer structure in an inert gas, such as nitrogen gas to obtain a two-phase glass-like carbon member having a porous glass-like carbon base and a dense glass-like carbon surface layer formed on the porous glass-like carbon base.

It is difficult to form the dense glass-like carbon surface layer in a thickness exceeding 5 mm because the dense thermosetting resin surface layer in a thickness exceeding 5 mm is often broken due to gas generation during carbonization.

If the thickness of the dense glass-like carbon surface layer is below 0.2 mm, the properties, such as gas impermeability and corrosion resistance, of the dense glass-like carbon surface layer are unsatisfactory, the dense glass-like carbon surface layer is liable to become defective during carbonization and the shape of the surface of the dense glass-like carbon surface layer is affected by surface irregularities in the porous glass-like carbon base. Therefore, the proper thickness of the dense glass-like carbon surface layer is between 0.2 and 5 mm. Since the surface roughness of the porous thermosetting resin base is about 0.1 mm at the maximum, the thickness of the dense thermosetting resin surface layer, namely, a preform for the dense glass-like carbon surface layer, is not smaller than 0.2 mm, preferably, not smaller than 0.4 mm to fill up depressions in the porous thermosetting resin base.

The thickness of the dense glass-like carbon surface layer can be adjusted by adjusting the thickness of the dense thermosetting resin surface layer, namely, a preform for the dense glass-like carbon surface layer, by a known method. For example, the thickness of the dense glass-like carbon surface layer can be adjusted by adjusting the resin concentration of the thermosetting resin liquid for forming the dense thermosetting resin surface layer by application or immersion or by properly determining the number of application cycles or immersion cycles. When the thermosetting resin liquid is applied directly to the porous thermosetting resin base with a brush or the like, the viscosity of the thermosetting resin liquid may be adjusted. If a dense thermosetting resin sheet is attached to the surface of the porous thermosetting resin base instead of forming the dense thermosetting resin surface layer on the porous thermosetting resin base, the thickness of the dense thermosetting resin sheet may be selectively determined.

The two-phase glass-like carbon member of the present invention consists of the porous glass-like carbon base and the dense glass-like carbon surface layer. The dense glass-like carbon surface layer exercises its functions to ensure gas impermeability and chemical stability, and the porous glass-like carbon base exercises its functions as a structural body. Therefore, the two-phase glass-like carbon member of the present invention exhibits its ability most effectively when the two-phase glass-like carbon member is designed such that parts that come into contact with a workpiece and/or parts that are exposed to the same atmosphere as a workpiece are coated with the dense glass-like carbon surface layer.

For example, when the two-phase glass-like carbon member is a disk-shaped susceptor for supporting a silicon wafer thereon, the two-phase glass-like carbon member is designed such that the dense glass-like carbon surface layer forms the upper surface, with which the silicon wafer comes into contact, of the susceptor, and the porous glass-like carbon base forms a body underlying the upper surface. When the two-phase glass-like carbon member is a processing vessel to process a silicon wafer therein by a thermal process, the two-phase glass-like carbon member is designed such that the dense glass-like carbon surface layer forms the inner surface of the processing vessel that needs to be corrosion-resistant, and the porous glass-like carbon base forms the wall of the processing vessel that needs to have a high structural strength. The two-phase glass-like carbon member can be formed in a complicated shape, such as the shape of a wafer boat.

EXAMPLES

Examples of the present invention will be described.

Two-phase glass-like carbon members in comparative examples 1 and 2 will be described to facilitate understanding the present invention.

Comparative Example 1

A square transparent, brown, poreless, square thermosetting resin molding of 10 mm×100 mm×100 mm was formed by subjecting a workpiece of phenolic resin powder (Phenolic resin powder S890 commercially available from Kanebo) to a compression molding process. In the compression molding process, the workpiece was heated in a mold at 200° C. and compressed at a pressure of 100 kg/cm². The thermosetting resin molding was heated at 200° C. for 100 hr in air for post curing, and then the cured thermosetting resin molding was carbonized by a carbonizing process that heated the cured thermosetting resin molding at 2000° C. in an atmosphere of nitrogen gas. The thermosetting resin molding was broken into fragments and a glass-like carbon molding could not be formed. A thick glass-like carbon molding of a thickness exceeding 5 mm could not be made by processing the dense thermosetting resin molding by the carbonizing process.

Comparative Example 2

A square porous thermosetting resin molding of 12 mm×100 mm×100 mm having through pores was formed by subjecting a workpiece of the phenolic resin powder used for forming the thermosetting resin molding in Comparative example 1 to a compression molding process. The thermosetting resin molding had and a porosity of 17%. In the compression molding process, the workpiece was heated in a mold at 170° C. The thermosetting resin molding was subjected to a post curing process and a carbonizing process under the same process conditions as the thermosetting resin molding in Comparative example 1. A porous glass-like carbon molding of 9.4 mm in thickness, 78 mm in length and 78 mm in width was obtained. A glass-like carbon molding of a thickness exceeding 5 mm can be easily manufactured by carbonizing the porous thermosetting resin molding.

The porosity v of the porous thermosetting resin molding in Comparative example 2 was determined by the following method.

Suppose that the porous thermosetting resin molding in Comparative example 2 had an apparent density $\rho$ of 1.03 g/cm³ (mass/volume), the thermosetting resin forming the porous thermosetting resin molding in Comparative example 2 had a density $\rho'$ of 1.24 g/cm³ (mass/volume). Then, Porosity $v=\{(1.24-1.03)/1.24\}\times100=17\%$ (% by volume)

Porous thermosetting resin moldings in Examples 1 to 3 were formed of a phenolic resin liquid having a moisture content of 5% by weight or below prepared by heating a phenolic resin (PL4304 commercially available from Gunnei Kagaku) at 100° C. for 1 hr at a reduced pressure for moisture content adjustment.

Example 1

A square porous thermosetting resin base of 12 mm×100 mm×100 mm having through pores was formed by subjecting a workpiece of phenolic resin powder (Phenolic resin powder S890 commercially available from Kaneobo) to a compression molding process. In the compression molding process, the workpiece was heated in a mold at 170° C. and compressed the workpiece at a pressure of 100 kg/cm². The thermosetting resin base had a porosity of 17%. The thermosetting resin base was the same as the thermosetting resin molding in Comparative example 2. The thermosetting resin base was heated at 200° C. for 100 hr for post curing. One of the major surfaces of the porous thermosetting resin base and the four side surfaces of the same were immersed for a short time in the phenolic resin liquid heated at 60° C. The porous thermosetting resin base partly impregnated with the phenolic resin liquid was heated at 70° C. for 10 hr in a dryer to form 0.4 mm thick dense thermosetting resin surface layers on the major surface and four side surfaces of the porous thermosetting resin base.

Then, the porous thermosetting resin base provided with the dense thermosetting resin surface layers was subjected to a carbonizing process. The carbonizing process heated the porous thermosetting resin base at 2000° C. in an atmosphere of nitrogen gas, which was the same process condition as those applied to Comparative example 1. Thus a square two-phase glass-like carbon member of 9.7 mm×78 mm×78 mm was obtained. The two-phase glass-like carbon member included a porous glass-like carbon base and 0.3 mm thick dense glass-like carbon surface layers coating the major surface and four side surfaces of the porous glass-like carbon base.

Example 2

Two square, transparent, brown, poreless, and dense thermosetting resin moldings of 3 mm×100 mm×100 mm were formed by subjecting workpieces of phenolic resin powder (Phenolic resin powder S890 commercially available from Kaneobo) to a compression molding process. In the compression molding process, the workpiece was heated in a mold at 200° C. and compressed at a pressure of 100 kg/cm². A porous thermosetting resin base was formed by the same method as those used in Example 1 and Comparative example 2. The porous thermosetting base was heated at 200° C. for 100 hr in air for post curing.

The dense thermosetting resin moldings of 3 mm×100 mm×100 mm were bonded to the major surfaces of the porous thermosetting resin base with a phenolic resin liquid as an adhesive to form a three-layer structure. The three-layer structure was heated at 70° C. for 10 hr in a dryer. The dried three-layer structure was subjected to a carbonizing process under the same process conditions as those used in Comparative example 1 and Example 1. The carbonizing process heated the three-layer structure at 2000° C. in an atmosphere of nitrogen gas. Thus a square two-phase glass-like carbon member of 78 mm×78 mm including the porous glass-like carbon base and 2.3 mm thick dense glass-like carbon surface layers coating the major surfaces of the porous glass-like carbon base was obtained.

Example 3

A circular porous thermosetting resin base of 10 mm in thickness and 450 mm in diameter having through pores was formed by subjecting a workpiece of phenolic resin powder (Phenolic resin powder S890 commercially available from Kaneobo) to a compression molding process. In the compression molding process, the workpiece was heated in a mold at 170° C. and compressed at a pressure of 100 kg/cm². The porous thermosetting resin base had a porosity of 17%. The porous thermosetting resin base was heated at 200° C. for 100 hr for post curing. One of the major surfaces of the porous thermosetting resin base was immersed for a short time in the phenolic resin liquid heated at 50° C. The porous thermosetting resin base partly impregnated with the phenolic resin liquid was heated at 70° C. for 10 hr in a dryer to form a 1.0 mm thick dense thermosetting resin surface layer on the major surface of the porous thermosetting resin base.

Then, the porous thermosetting resin base provided with the dense thermosetting resin surface layer was subjected to a carbonizing process. The carbonizing process heated the porous thermosetting resin base at 2000° C. in an atmosphere of nitrogen gas, which was the same process condition as those applied to Comparative example 1 and Examples 1 and 2. Thus a circular two-phase glass-like carbon member 1 of 10 mm in thickness and 360 mm in diameter having the shape of a disk was obtained. The two-phase glass-like carbon member included a disk-shaped porous glass-like carbon base $1a$ of 10 mm in thickness and 360 mm in diameter and a 0.8 mm thick, dense glass-like carbon surface layer $1b$ coating one of the major surfaces of the porous glass-like carbon base $1a$ as shown in a typical sectional view in FIG. 1. The two-phase glass-like carbon member was suitable for use as a susceptor for supporting a silicon wafer on the dense glass-like carbon surface layer $1b$.

The foregoing invention has been described in terms of preferred embodiments. However, those skilled, in the art will recognize that many variations of such embodiments exist. Such variations are intended to be within the scope of the present invention and the appended claims.

What is claimed is:

1. A two-phase glass-like carbon member comprising: a porous glass-like carbon base; and a dense glass-like carbon surface layer coating a surface of the porous glass-like carbon base, wherein the dense glass-like carbon surface layer has a thickness in the range from 0.4 mm to 5 mm.

2. A method of manufacturing the two-phase glass-like carbon member stated in claim 1 comprising the steps of: forming a porous thermosetting resin base by heating and compressing a workpiece of a solid thermosetting resin for curing and molding; forming a two-layer structure by coating a surface of the porous thermosetting resin base with a dense thermosetting resin surface layer; and completing a two-phase glass-like carbon member including a porous glass-like carbon base and a dense glass-like carbon surface layer formed on the porous glass-like carbon base by heating the two-layer structure for carbonization.

3. The manufacturing method according to claim 2 further comprising the step of curing the porous thermosetting resin base at a temperature between 200 and 300° C. for a time between 10 and 100 hr for a post curing process before the step of forming the two-layer structure by coating the surface of the porous thermosetting resin base with the dense thermosetting resin surface layer.

4. The manufacturing method according to claim 2, wherein the porous thermosetting resin base and the dense thermosetting resin surface layer are formed of the same thermosetting resin.

5. The manufacturing method according to claim 4, wherein the thermosetting resin forming the porous thermosetting resin base and the dense thermosetting resin surface layer is a phenolic resin.

6. The two-phase glass-like carbon member according to claim 1, wherein the porous glass-like carbon base has ten or less pores of diameters not smaller than 10 μm in a region of 100 μm².

7. The two-phase glass-like carbon member according to claim 1, wherein the porous glass-like carbon base has pores of diameters exceeding 10 μm occupying 1% or above of the area of a region of 100 μm².

8. The two-phase glass-like carbon member according to claim 1, wherein 1 cm³ of ethanol dropped in an area of the porous glass-like carbon base having a diameter between 50 and 100 mm passes through the specimen within 10 s.

* * * * *